United States Patent
Walker et al.

(10) Patent No.: US 10,943,071 B2
(45) Date of Patent: *Mar. 9, 2021

(54) STATISTICAL PREPARATION OF DATA USING SEMANTIC CLUSTERING

(71) Applicant: International Business Machines Corporation, Armonk, NY (US)

(72) Inventors: Daniel V Walker, Chicago, IL (US); Graham J Wills, Naperville, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/440,049

(22) Filed: Jun. 13, 2019

(65) Prior Publication Data

US 2019/0294681 A1    Sep. 26, 2019

Related U.S. Application Data

(63) Continuation of application No. 15/888,621, filed on Feb. 5, 2018.

(51) Int. Cl.
| | |
|---|---|
| *G06F 40/30* | (2020.01) |
| *G06F 16/31* | (2019.01) |
| *G06F 16/35* | (2019.01) |
| *G06F 40/253* | (2020.01) |
| *G06F 40/205* | (2020.01) |

(52) U.S. Cl.
CPC ............ *G06F 40/30* (2020.01); *G06F 16/313* (2019.01); *G06F 16/322* (2019.01); *G06F 16/353* (2019.01); *G06F 40/205* (2020.01); *G06F 40/253* (2020.01)

(58) Field of Classification Search
CPC .. G06F 17/2785; G06F 16/322; G06F 16/353; G06F 17/2705
See application file for complete search history.

(56) References Cited

U.S. PATENT DOCUMENTS

| | | | |
|---|---|---|---|
| 7,558,778 B2 | 7/2009 | Carus et al. | |
| 8,145,677 B2 | 3/2012 | Al-Shameri | |
| 8,805,840 B1 * | 8/2014 | Joshi | G06F 16/951 707/737 |
| 8,868,573 B2 | 10/2014 | Chu et al. | |

(Continued)

OTHER PUBLICATIONS

"Use domasin knowledge to Improve data mining performance of very large data-sets via clustering," An IP.com Prior Art Database Technical Disclosure, Authors et al.: IBM, Original Publication Date: Oct. 7, 2005, IP.com No. IPCOM000129866D, IP.com Electronic Publication Date: Oct. 7, 2005, 4 pages.

(Continued)

*Primary Examiner* — Sonia L Gay
(74) *Attorney, Agent, or Firm* — Patterson + Sheridan, LLP

(57) ABSTRACT

Performing an operation comprising analyzing an electronic text corpus by a natural language processing (NLP) algorithm executing on a processor to determine a set of target terms specified in the electronic text corpus, analyzing the electronic text corpus by the NLP algorithm to determine a weight for each pair of terms in the set of target terms, and storing an indication of each pair of terms and the respective weight in a lookup table in a computer memory for runtime analysis of an input text data.

7 Claims, 6 Drawing Sheets

(56) References Cited

U.S. PATENT DOCUMENTS

| | | | |
|---|---|---|---|
| 9,378,202 B2 | 6/2016 | Larcheveque et al. | |
| 9,613,004 B2 | 4/2017 | Liang et al. | |
| 2012/0150867 A1* | 6/2012 | Contractor | G06F 16/355 |
| | | | 707/742 |
| 2015/0178268 A1 | 6/2015 | Zuev et al. | |
| 2015/0261850 A1* | 9/2015 | Mittal | G06F 16/3344 |
| | | | 707/724 |
| 2016/0092557 A1 | 3/2016 | Stojanovic et al. | |
| 2016/0104481 A1 | 4/2016 | Ehsan et al. | |
| 2016/0292069 A1 | 10/2016 | Farchi et al. | |

OTHER PUBLICATIONS

A method for the generation of large synthetic test datasets based on cluster models, and using database views as the generation mechanism Authors el al.: Disclosed Anonymously IP.com No. IPCOM000238143D IP.com Electronic Publication Date: Aug. 5, 2014.

Breaux, TD. et al.; "Using Ontology in Hierarchical Information Clustering"; Proceedings of the 38th Hawaii International Conference on System Sciences; 2005.

IBM, "List of IBM Patents or Patent Applications Treated as Related," for U.S. Appl. No. 16/440,049, "Statistical Preparation of Data Using Semantic Clustering," filed Jun. 13, 2019.

U.S. Appl. No. 15/888,621, "Title: Statistical Preparation of Data Using Semantic Clustering," filed Jun. 13, 2019.

\* cited by examiner

| TERM 201 | TERM 202 | WEIGHT 203 |
|---|---|---|
| FINANCE | BANKING | 0.9 |
| FINANCE | FOOD SERVICES | 0.1 |
| SALES | FINANCES | 0.65 |
| ... | ... | ... |
| SALES | CUSTOMER SUPPORT | 0.75 |

US 10,943,071 B2

STATISTICAL PREPARATION OF DATA USING SEMANTIC CLUSTERING

CROSS-REFERENCE TO RELATED APPLICATIONS

This application is a continuation of co-pending U.S. patent application Ser. No. 15/888,621, filed on Feb. 5, 2018. The aforementioned related patent application is herein incorporated by reference in its entirety.

BACKGROUND

The present invention relates to data processing, and more specifically, to statistical preparation of data using semantic clustering.

Data scientists spend significant time preparing data for analysis, e.g., by formatting, importing, validating, and reshaping data. One particular challenge is ensuring that data is suitable for efficient statistical or machine learning analysis. Conventional statistical algorithms and machine learning algorithms work most efficiently when applied to a dataset having a limited number of categories. However, conventional techniques cannot rapidly transform a column of data that has large numbers of unique categories into a bounded, smaller number of categories for use by the statistical and machine learning algorithms.

SUMMARY

According to one embodiment of the present invention, a method comprises analyzing an electronic text corpus by a natural language processing (NLP) algorithm executing on a processor to determine a set of target terms specified in the electronic text corpus, analyzing the electronic text corpus by the NLP algorithm to determine a weight for each pair of terms in the set of target terms, and storing an indication of each pair of terms and the respective weight in a lookup table in a computer memory for runtime analysis of an input text data.

DETAILED DESCRIPTION

Embodiments disclosed herein process a corpus of text data to generate a lookup table that specifies relationships between a subset of the terms in the corpus. The lookup table is stored in memory for fast access by clustering algorithms and/or machine learning (ML) algorithms. By leveraging the lookup table, the performance of the clustering and/or ML algorithms is improved during runtime processing of input text data. In a first preprocessing step, embodiments disclosed herein apply one or more natural language processing (NLP) algorithms to identify a subset of target terms (and/or phrases) in the corpus of text data. In a second preprocessing step, one or more NLP algorithms are applied to the corpus of text data to build dependency strengths (also referred to as weights) describing relationships between the terms in the identified subset.

For example, in the first preprocessing step, the NLP algorithms may identify, in a corpus of data that includes department names of an organization, the terms "finance" and "customer support" as two of a plurality of example target terms. In the second preprocessing step, the NLP algorithms may compute values describing the relationships between the plurality of terms, including "finance" and "customer support". The computed values may then be stored in the lookup table. During runtime, a clustering algorithm may identify the term "finance" in a column of input data, and leverage the weights specified in the lookup table to cluster the term faster than using a traditional clustering analysis. Doing so improves the performance of the system executing the clustering algorithm as well as the performance of the clustering algorithm itself.

Figure 1:
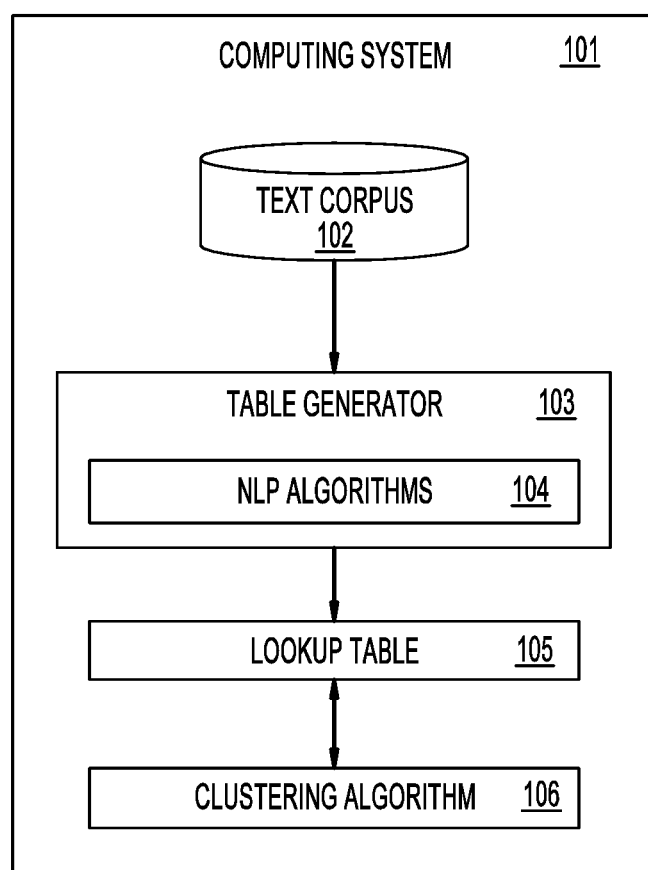
FIG. 1 illustrates a system which applies statistical preparation of data using semantic clustering, according to one embodiment.

FIG. 1 illustrates a computing system 101 which applies statistical preparation of data using semantic clustering, according to one embodiment. As shown, the computing system 101 includes a text corpus 102, a table generator 103, a lookup table 105, and a clustering algorithm 106. The text corpus 102 generally includes text data in any type of format, such as electronic documents, social media posts, emails, and the like. The table generator 103 is configured to generate the lookup table 105, which stores indications of relationships between two or more words (and/or phrases) that have been identified in the text corpus 102.

To generate the lookup table 105, the table generator 103 applies two steps. In the first step, the table generator 103 applies one or more NLP algorithms 104 to the text corpus 102 to identify a set of target terms (or phrases) that are a subset of the terms in the text corpus 102. The NLP algorithms 104 are representative of any type of NLP algorithm, such as parsers, part of speech extractors, tokenizers, co-occurrence counters, etc. Generally, the NLP algorithms 104 may use any technique to identify the set of target terms, such as chunking the text of each sentence, identifying parts of speech in each sentence, generating parse trees for each sentence, and/or identifying noun phrases that have fewer than a threshold number of terms. For example, when chunking the text, the NLP algorithms 104 may identify the most frequently occurring words and/or phrases, and return these words and/or phrases as the set of target terms. As another example, when identifying the parts of speech in each sentence, the NLP algorithms 104 may identify the most frequently occurring nouns, verbs, etc., as the stet of target terms. As another example, when generating parse trees for each sentence, the NLP algorithms 104 may identify the word (or words) that are most frequently determined by the parse trees to be part of a dependency relationship, and return these word(s) as the set of target terms. As still another example, the NLP algorithms 104 may return the most frequently occurring noun phrases having 3 or fewer terms from the text corpus 102 as the set of target terms.

In the second step, the table generator 103 applies one or more NLP algorithms 104 to the text of the text corpus 102 to compute weight values (or scores) specifying the strength of a relationship (e.g., a dependency and/or similarity) between each pair of terms in the set of target terms. To compute the values, the table generator 103 may apply one or more techniques. For example, the table generator 103 may apply an NLP algorithm 104 that counts the co-occurrences of each pair of target terms in a given sentence (or other window of words), compute the distance between each word in the text (e.g., an average of 5 words separate a given pair of target terms in the set), and/or determine the type of dependency between the pair of terms in a given sentence. For example, the table generator 103 may compute a relatively high weight value for a pair of terms having high co-occurrence counts in the text corpus 102, while computing a relatively low weight value for a pair of terms having low co-occurrence counts in the text corpus 102, as words that appear together more frequently are more likely to be related. Similarly, if a pair of words frequently appear in close distance (e.g., the words are often adjacent), the table generator 103 may compute a greater weight value for the terms, as words that appear in close proximity in the text are more likely to be related. As another example, the table generator 103 may compute a greater weight value for a pair of terms that have a semantic and/or syntactic relationship, rather than a pair of terms that have a weaker relationship. For example, the terms "socks" and "shoes" in the sentence "socks are bought when shoes are bought" may result in a higher weight than when in the sentence "I bought some shoes and socks".

Once the lookup table 105 is generated, the clustering algorithm 106 (and/or any other machine learning algorithm) may use the lookup table 105 to process input text data. Generally, a clustering algorithm groups input data into one of a plurality of different clusters, such that data that is clustered into the same cluster are more similar to each other than to data in other clusters. For example, if the lookup table 105 specifies weights between different departments for a first organization, the clustering algorithm 106 may use the lookup table 105 when clustering input text data (e.g., a database column of department names) for a second organization. Doing so improves the performance of the system 101, as the clustering algorithm 106 can rapidly access the lookup table 105 to cluster input data, rather than performing a traditional, slower clustering analysis.

Figure 2:
FIG. 2 illustrates an example lookup table generated based on statistical preparation of data using semantic clustering, according to one embodiment.

FIG. 2 illustrates a portion of an example lookup table 105 generated based on statistical preparation of data using semantic clustering, according to one embodiment. As shown, the lookup table 104 includes a term column 201, a term column 202, and a weight column 203. The term columns 201, 202 each correspond to one or more terms identified as target terms during the first processing step of the text corpus 102. The weight value 203 corresponds to the value for the pair of terms 201, 202 computed during the second processing step of the text corpus 102. For example, as shown, the lookup table 105 specifies a weight value of 0.9 (on a scale of 0.0-1.0) for the terms "finance" and "banking", reflecting a relatively strong relationship between the terms. However, as shown, the lookup table 105 specifies a weight value of 0.1 for the terms "finance" and "food services", indicating these terms do not have a strong relationship.

Figure 3:
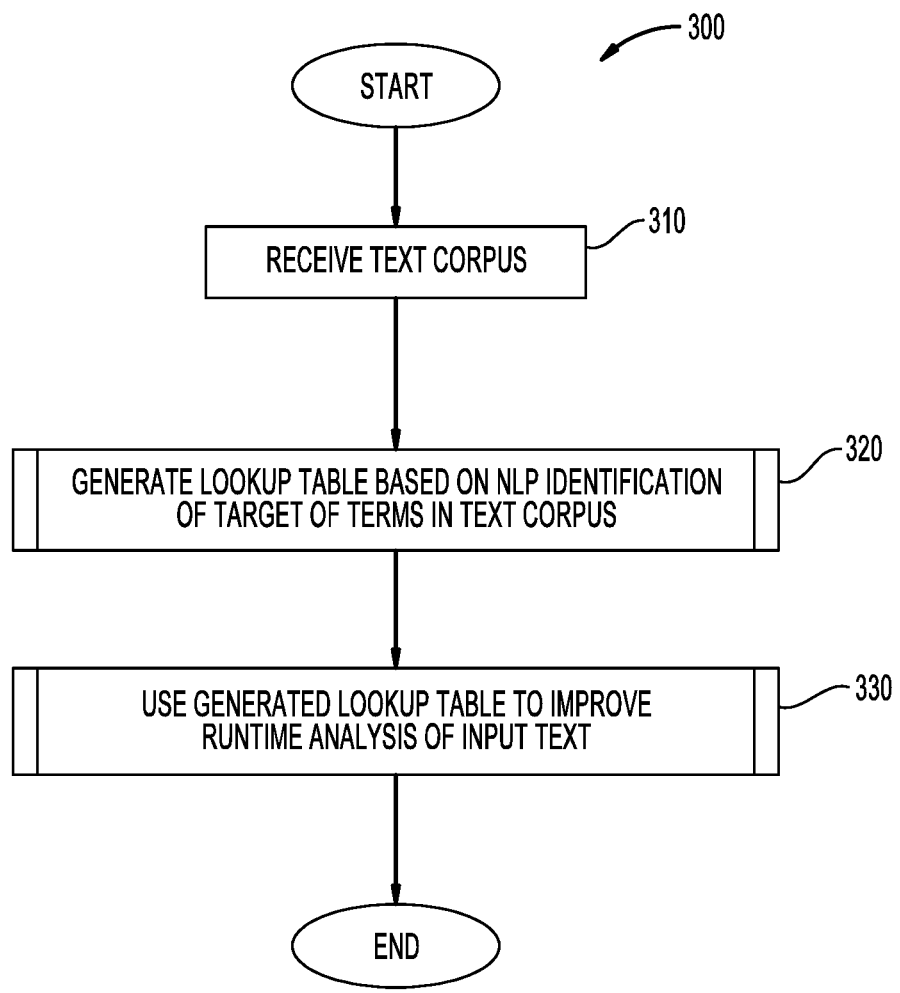
FIG. 3 is a flow chart illustrating a method for statistical preparation of data using semantic clustering, according to one embodiment.

FIG. 3 is a flow chart illustrating a method 300 for statistical preparation of data using semantic clustering, according to one embodiment. As shown, the method 300 begins at block 310, where a text corpus 102 is received by the table generator 103. Generally, the text corpus 102 may be in any form, and defines the domain that the table generator 103 operates within. At block 320, described in greater detail with reference to FIG. 4, the table generator 103 generates the lookup table 105. As previously stated, the table generator 103 applies one or more NLP algorithms 104 to the text corpus 102 to identify a set of target terms, phrases, and/or concepts in the text of the text corpus 102. Once the set of target terms are identified, the table generator 103 applies the NLP algorithms 104 to the text corpus to compute weight values specifying a relationship between each term in the set of target terms. At block 330, described in greater detail with reference to FIG. 5, the clustering algorithm 106 and/or any other ML algorithm may use the lookup table 105 to improve runtime analysis of input text. The input text may include the text in the corpus 102 and/or include text received from other sources for analysis.

Figure 4:
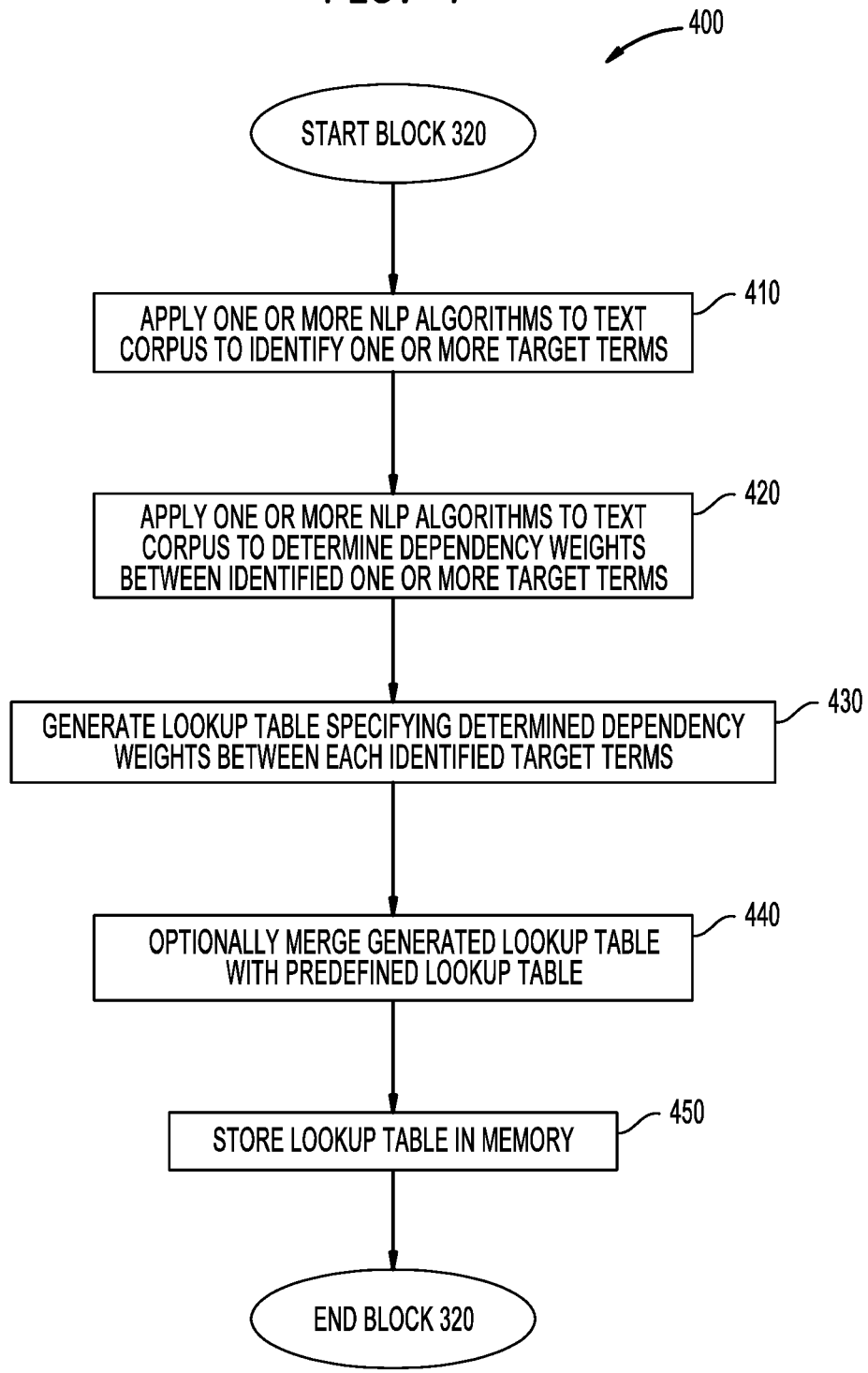
FIG. 4 is a flow chart illustrating a method to generate a lookup table, according to one embodiment.

FIG. 4 is a flow chart illustrating a method 400 corresponding to block 320 to generate a lookup table, according to one embodiment. As shown, the method 400 begins at block 410, where the table generator 103 applies one or more NLP algorithms 104 to the text of the text corpus 102 to identify one or more target terms in the text corpus 102. As previously stated, the table generator 103 may apply any different number and type of NLP algorithms 104 to identify the set of target terms. The set of target terms may be of any size, and/or may be limited to a specified size threshold. For example, a first NLP algorithm 104 may perform chunking on the text corpus 102 to identify the most frequently occurring nouns in the text corpus 102 as target terms. A second NLP algorithm 104 may determine the parts of speech in sentences of the text corpus 102, and identify the most frequently occurring parts of speech as target terms. A third NLP algorithm 104 may generate a grammar parse tree for each sentence, and determine the words most frequently occurring in dependencies as target terms. A fourth NLP algorithm 104 may identify each noun phrase having a number of words that is less than a predefined size threshold (e.g., all noun phrases of 3 words or less) as target terms.

At block 420, the table generator 103 applies one or more NLP algorithms 104 to the text corpus 102 to determine the dependency weights for each term in the set of target terms determined at block 410. In at least one embodiment, the NLP algorithms 104 applied at block 420 are parsers that determine dependency strengths between the target terms in the set of target terms. The parsers may determine the dependency strengths based on one or more of co-occurrence counts between target terms (e.g., how frequently the target term pairs appear within an n-window context in the text corpus 102), textual distance between each occurrence of target word pairs, and a type of dependence between two target terms in the same sentence. At block 430, the table generator 103 generates the lookup table 105 specifying the weights determined at block 420 for each pair of target terms identified at block 410. At block 440, the table generator 103 optionally merges the lookup table 105 with a predefined lookup table of known term pairs and corresponding weights to supplement the lookup table 105. At block 450, the table generator 103 stores the lookup table 105 in memory.

Figure 5:
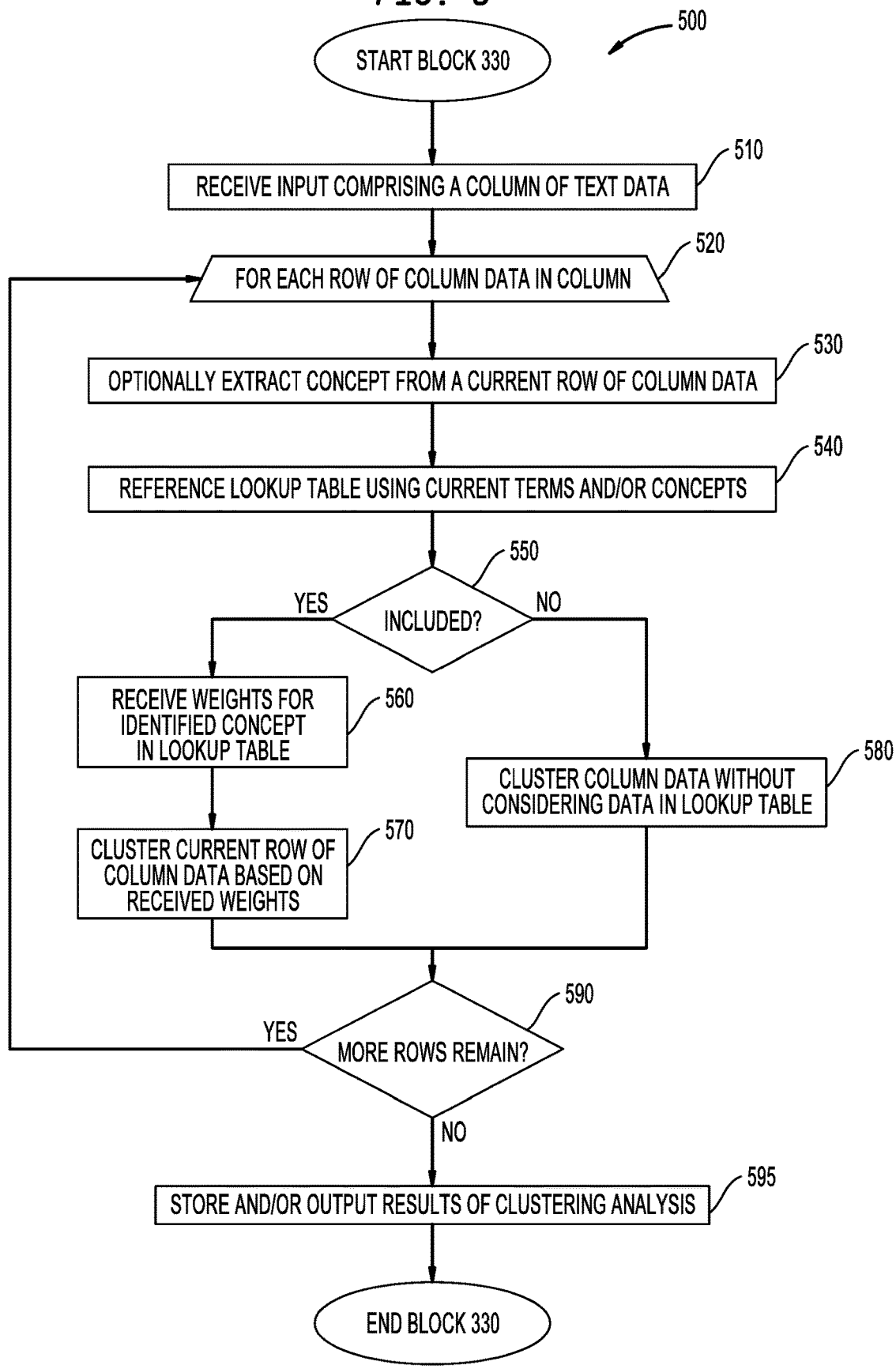
FIG. 5 is a flow chart illustrating a method to use a lookup table to improve runtime analysis of input text, according to one embodiment.

FIG. 5 is a flow chart illustrating a method 500 corresponding to block 330 to use a lookup table to improve runtime analysis of input text, according to one embodiment. As shown, the method 500 begins at block 510, where the clustering algorithm 106 receives input comprising a column of text data (e.g., a column of names, places, etc.). At block 520, the clustering algorithm 106 executes a loop including blocks 530-590 for each row of data in the column (e.g., each name, place, etc.). At block 530, one or more NLP algorithms 104 are optionally applied to the current text to extract one or more concepts therefrom. Doing so may allow more frequent matches to the lookup table 105. At block 540, the clustering algorithm 106 references the lookup table 105 using the terms in the current row of column data and/or the concepts extracted at block 530.

At block 550, a determination is made as to whether the lookup table 105 includes one or more entries including the current terms and/or concepts. If the terms and/or concepts are included in the lookup table, the method proceeds to block 560, where the clustering algorithm 106 receives the weights from the lookup table 105. At block 570, the clustering algorithm 106 clusters the current row of column data based on the weights received at block 560. In one embodiment, the clustering algorithm 106 clusters the current row of column data into the cluster of the term having the highest weight value returned at block 560. For example, if the current term is "finance", and the lookup table 105 returns values of "0.9", "0.8", and "0.2" for "investment", "regulations", and "charity", respectively, the clustering algorithm 106 may cluster the term "finance" into the same cluster as the term "investment". However, in other embodiments, the clustering algorithm 106 may consider the weight values as part of an additional clustering analysis. The method then proceeds to block 590.

Returning to block 550, if the current term is not included in the lookup table 105, the method proceeds to block 580, where the clustering algorithm 106 clusters the current row of column data without considering the data in the lookup table 105. At block 590, the clustering algorithm 106 determines whether more rows of column data remain. If more rows of column data remain, the method returns to block 520. Otherwise, all rows of column data have been clustered, and the method proceeds to block 595, where the clustering results generated by the clustering algorithm 106 are stored and/or outputted for display.

Figure 6:
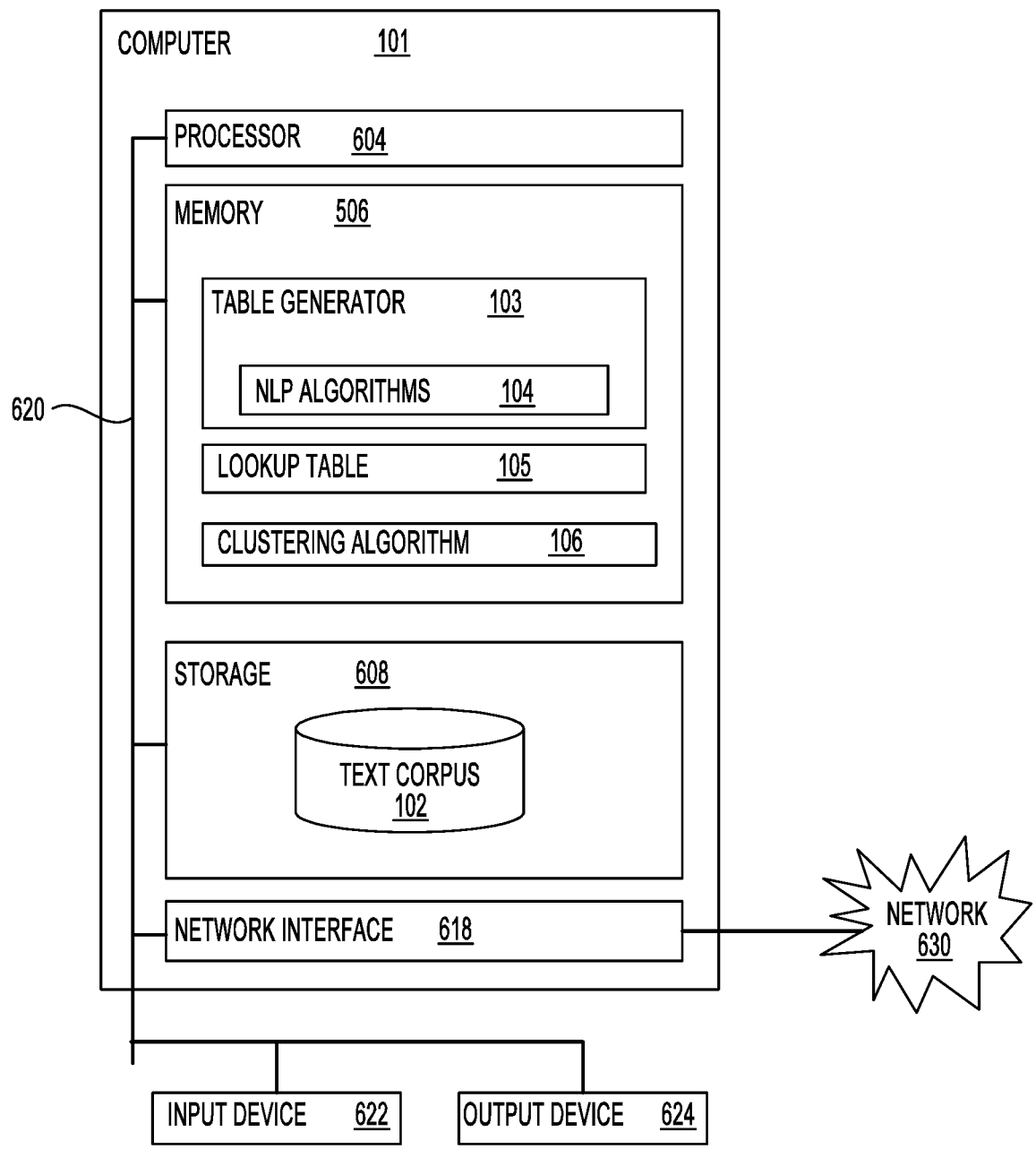
FIG. 6 illustrates a system which applies statistical preparation of data using semantic clustering, according to one embodiment.

FIG. 6 illustrates a system 600 which applies statistical preparation of data using semantic clustering, according to one embodiment. The networked system 600 includes the computing system 101. The computing system 101 may also be connected to other computers via a network 630. In general, the network 630 may be a telecommunications network and/or a wide area network (WAN). In a particular embodiment, the network 630 is the Internet.

The computing system 101 generally includes a processor 604 which obtains instructions and data via a bus 620 from a memory 606 and/or a storage 608. The computing system 101 may also include one or more network interface devices 618, input devices 622, and output devices 624 connected to the bus 620. The computing system 101 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 604 is a programmable logic device that performs instruction, logic, and mathematical processing, and may be representative of one or more CPUs. The network interface device 618 may be any type of network communications device allowing the computing system 101 to communicate with other computers via the network 630.

The storage 608 is representative of hard-disk drives, solid state drives, flash memory devices, optical media and the like. Generally, the storage 608 stores application programs and data for use by the computing system 101. In addition, the memory 606 and the storage 608 may be considered to include memory physically located elsewhere; for example, on another computer coupled to the computing system 101 via the bus 620.

The input device 622 may be any device for providing input to the computing system 101. For example, a keyboard and/or a mouse may be used. The input device 622 represents a wide variety of input devices, including keyboards, mice, controllers, and so on. Furthermore, the input device 622 may include a set of buttons, switches or other physical device mechanisms for controlling the computing system 101. The output device 624 may include output devices such as monitors, touch screen displays, and so on.

As shown, the memory 606 contains table generator 103, the NLP algorithms 104, the lookup table 105, and the clustering algorithm 106, each of which is described in greater detail above. As shown, the storage 608 contains the text corpus 102, described in greater detail above. Generally, the system 600 is configured to implement all systems, methods, and functionality described above with reference to FIGS. 1-5.

Advantageously, embodiments disclosed herein provide an enhanced preprocessing of text data that improves runtime analysis of text data by a computing system. More specifically, embodiments disclosed herein define, in a lookup table, weights describing the strength of relationships between pairs of words in a training text corpus. The lookup table may be stored in a memory to improve statistical analysis of input data (e.g., classification of text data) by reducing the amount of processing necessary to analyze the input data. Doing so improves performance of the system and the associated algorithms.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the table generator 103 could execute on a computing system in the cloud and generate one or more lookup tables 105. In such a case, the table generator 103 could store the lookup tables 105 at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising: analyzing an electronic text corpus using a natural language processing (NLP) algorithm to determine a weight for each pair of terms in a set of target terms; storing an indication of each pair of terms and the respective weight in a lookup table in a computer memory for runtime analysis of an input text data; receiving, at runtime, input data; upon determining that a first term included in a first row of the input data is not included in the lookup table, clustering the first row without reference to the lookup table; and upon determining that a second term included in a second row of the input data is included in the lookup table: clustering the second row based at least in part on a first weight in the lookup table.

2. The method of claim 1, further comprising:
   clustering each row of a plurality of rows in the input data into a plurality of clusters, based at least in part on the weights specified in the lookup table for each pair of terms.

3. The method of claim 1, the method further comprising analyzing the text corpus to determine the set of target terms, comprising one or more of:
   applying the NLP to perform a chunking of a text of the electronic text corpus, wherein the set of target terms comprises a one or more terms determined to be most frequently occurring in the electronic text corpus; and
   applying the NLP algorithm to identify, for each of a plurality of sentences in the electronic text corpus, a plurality of parts of speech of each sentence, wherein the set of target terms further comprises one or more terms most frequently occurring as a first part of speech in each sentence.

4. The method of claim 3, wherein analyzing the text corpus to determine the set of target terms further comprises one or more of:
   generating a grammar parse tree for each sentence in the electronic text corpus, wherein the set of target terms further comprises one or more terms determined to be included in a count of dependencies exceeding a dependency threshold; and
   identifying a set of noun phrases having a number of words that is less than a phrase threshold, wherein the set of terms further comprises the identified set of noun phrases.

5. The method of claim 1, wherein analyzing the text corpus to determine the weight for each pair of terms is based on one or more of:
   determining a co-occurrence count of the terms in each term pair;
   determining an average textual distance between the terms of each term pair;
   determining a type of dependency between the terms in each parse tree generated for the term pair.

6. The method of claim 1, wherein the electronic text corpus is specific to a domain, wherein the generated lookup table is specific to the domain.

7. The method of claim 6, further comprising:
   merging the generated lookup table with a predefined lookup table comprising a plurality of predefined pairs of terms and associated weights.

* * * * *